US005776289A

United States Patent [19]
Steidinger

[11] Patent Number: 5,776,289
[45] Date of Patent: Jul. 7, 1998

[54] APPARATUS AND METHOD FOR APPLYING LABELS USING STATIC ELECTRICAL ATTRACTION

[75] Inventor: Donald J. Steidinger, Barrington, Ill.

[73] Assignee: Tamarack Products, Inc., Wauconda, Ill.

[21] Appl. No.: 537,264

[22] Filed: Sep. 29, 1995

[51] Int. Cl.[6] ........ B32B 31/00
[52] U.S. Cl. ........ 156/273.1; 156/567; 156/568; 271/193; 271/275
[58] Field of Search ........ 156/567, 568, 156/86, 273.1; 271/193, 275, 276

[56] References Cited

U.S. PATENT DOCUMENTS

| | | | |
|---|---|---|---|
| 287,957 | 11/1883 | Osborne . | |
| 2,990,081 | 6/1961 | De Neui et al. . | |
| 3,172,657 | 3/1965 | Brandt | 271/275 |
| 4,347,094 | 8/1982 | Watanabe | 156/568 X |
| 4,437,659 | 3/1984 | Caron et al. | 271/276 |
| 4,642,085 | 2/1987 | Helm . | |
| 4,923,557 | 5/1990 | Dickey | 156/86 |
| 5,061,334 | 10/1991 | Paules . | |
| 5,387,298 | 2/1995 | Takagi et al. . | |
| 5,413,651 | 5/1995 | Otruba . | |
| 5,482,593 | 1/1996 | Kuhn et al. . | |

*Primary Examiner*—James Engel
*Attorney, Agent, or Firm*—Emrich & Dithmar

[57] ABSTRACT

Apparatus and method of applying labels which includes providing (a) an applicator cylinder and a drive for rotating the applicator cylinder and (b) a source of discrete lengths of label material, traveling the lengths with the applicator cylinder, applying an electrostatic charge to the discrete lengths, advancing a carrier for sequentially receiving the discrete lengths from the applicator cylinder at a point of application, equipping one of the carrier and discrete lengths with an adhesive having an initial tack, and controlling the attraction of the discrete lengths to the applicator cylinder adjacent the point of application.

5 Claims, 2 Drawing Sheets

APPARATUS AND METHOD FOR APPLYING LABELS USING STATIC ELECTRICAL ATTRACTION

BACKGROUND AND SUMMARY OF INVENTION

This invention relates to label applicator apparatus and method used to affix labels, covering for envelope window openings, pieces of paper or plastic film and other generally flexible materials to a carrier in the form of continuous webs, cut sheets, packages, bottles and the like. More particularly, it applies to labeling apparatus using static electrical charges to feed and control the label to be applied by an applicator cylinder and to dissipate the static charge so the label can be transferred to the carrier without the use of stripping devices to effect the release and transfer. Further it concerns transfer to non-conductive carrier materials that do not facilitate the dissipation of the static charge at the point of transfer.

It is well known to use vacuum to control labels during processing on the label applicator. Labels are used as a general term when referring to items to be affixed which are often other than labels such as envelope window coverings, pieces of paper or plastic film. Tamarack Products Inc. of Wauconda, Ill. 60084 has been manufacturing label applicators using vacuum for many years as have many other machinery builders. Prior art U.S. Pat. Nos. 5,413,651, 5,061,334, 4,624,085 and 2,990,081 are typical of label applicators using vacuum applicator cylinders. Although vacuum applicators can be made to work reliably and at high speeds, they do have some shortcomings. Where the applicator cylinder serves as an anvil for the cutoff of the label, the space required for the holes on the surface of the cylinder restrict the position at which the cutoff can be made. Thus the cylinders must be made with circumferences and vacuum hole size and spacing to accommodate specific label lengths and/or label spacing. This tends to require a multiple of changeable cylinders to accommodate all the desired lengths. Further, the manufacture of cylinders with many vacuum holes, ports and manifolds are expensive particularly when the cylinder is to be hardened for use as an anvil for the cut-off. Finally, the vacuum pumps and supply systems are objectionably noisy as well as expensive and maintenance prone.

Nonetheless, operators in the label industry and business forms industry generally uniformly used vacuum on the applicator cylinder. And even though electrostatic systems were well known— the 1883 U.S. Pat. No. 287,957—no one saw fit to employ this technique for labels. In fact, the electrostatic phenomenon was considered more of a drawback than a help. It prevented the square stacking of sheets, for example. And it was not unusual for the operator of a collator to drape a conductive tinsel across advancing webs and cut labels to dissipate the electrostatic charges which would otherwise be retained—and produce unwanted effects downstream.

A recent usage of electrostatic charge—in the 1995 U.S. Pat. No. 5,387,298—did not have to cope with the problems of more delicate label handling because the insulating tape sheets were bonded by heat fusion to each other at the point of transfer and to the encapsulated wire conductors. More particularly, in the '298 patent there was no teaching of controlling the magnitude and location of the electrostatic charge to achieve advantageous dissipation.

It is the object of this invention to use static electrical charges to feed and control labels supplied from a continuous web on an applicator cylinder until it is applied to a carrier. A second objective is to provide a label applicator that can accommodate a large range of label lengths with only one applicator cylinder. Another objective is to dissipate the static electrical charge without the use of stripping devices. Still another objective is to apply labels to a non-conductive carrier by dissipating the static electrical charge before the point of transfer so the transfer takes place without stripping devices and requires minimal force to effect the transfer. A further objective is to reduce the cost to manufacture a label applicator. A final objective is to eliminate the noise resulting from vacuum pumps and blowers. The objectives are achieved by the instant label applicator invention which includes a frame, an applicator cylinder rotatably mounted on the frame, means operably associated with the frame for rotating the applicator cylinder, a source of label web material operably associated with the frame, means operably associated with the frame, for advancing the label web material along a-path from the source to the applicator cylinder, means on the frame for applying an electrostatic charge to the discrete lengths while transported on the applicator cylinder, means operably associated with the frame for advancing carrier means for sequentially receiving the discrete lengths at a point of application, and means operably associated with the applying means for controlling the magnitude and location of the electrostatic charge for controlling the attraction between the point of transport of the discrete lengths and the point of application.

The aforementioned controlling means are also advantageously employed to apply the electrostatic charge to only a portion of the applicator cylinder. It is also a function to dissipate the electrostatic charge to release and transfer the discrete lengths at the point of application.

The inventive method of applying labels includes the steps of providing (a) an applicator cylinder and means for rotating the applicator cylinder and (b) providing a source of discrete lengths of label material, the action steps of the invention including traveling the lengths with the applicator cylinder, applying an electrostatic charge to the discrete lengths, advancing carrier means for sequentially receiving the discrete lengths from the applicator cylinder at a point of application, equipping one of the carrier means and discrete lengths with an adhesive a having an initial tack, and controlling the attraction of the discrete lengths to the applicator cylinder adjacent the point of application.

BRIEF DESCRIPTION OF DRAWING

The invention is described in conjunction with the accompanying drawing, in which.

DETAILED DESCRIPTION

Figure 1:
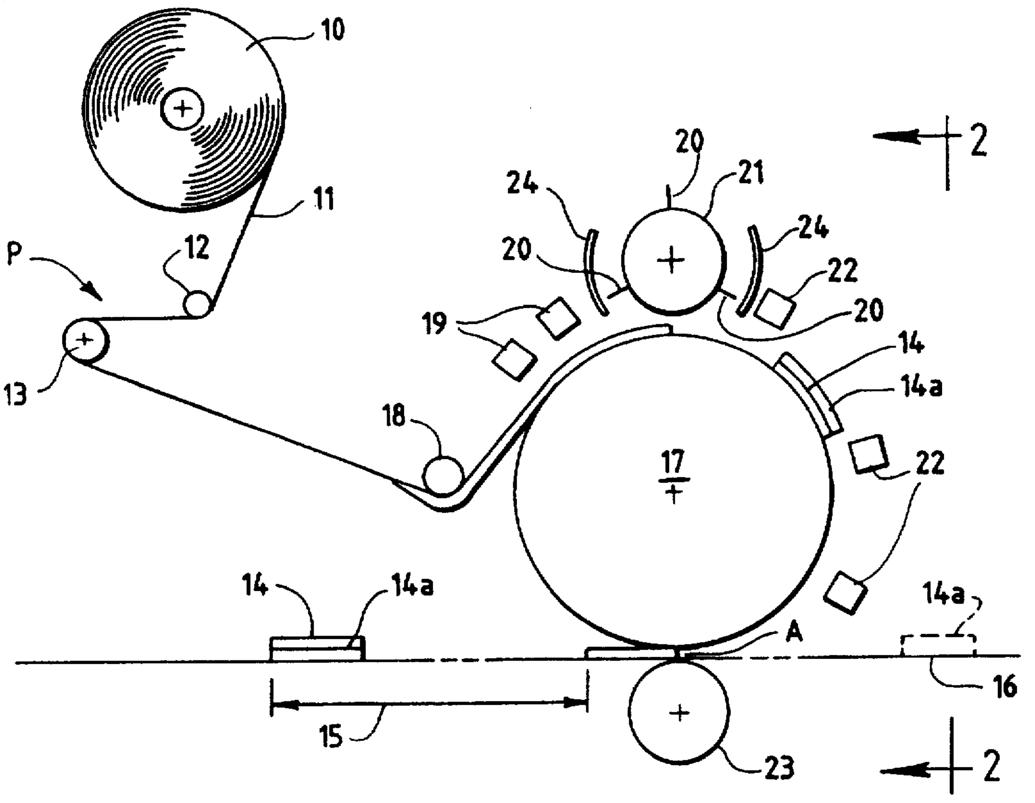
FIG. 1 is a side elevational view (somewhat schematic) of apparatus employed to advantage in the practice of the invention.

Referring to FIG. 1, a roll 10 of label material to be applied unwinds to form a web 11 of the material. The web 11 is routed by idler roller 12 to feed roll 13 which advances the web 11 along a path generally designated P. The speed of feed roll 13 can be adjusted to provide the desired discrete length of label 14 (sometimes referred to as a "segment") for each interval 15 of application on the carrier 16—see the bottom of FIG. 1. The web 11 is advanced to the applicator cylinder 17 by means of an idler 18. Static charge generating bars 19 are positioned along the surface of applicator cylinder 17 contacted by the web 11 before the web reaches the line of cutoff developed by cutter knives 20 on cutoff roll 21.

The static charge bars 19 induce a charge in the leading portion of the web which is in engagement with the surface of cylinder 17 and cause the web 11 to be attracted to the cylinder 17. That is, the cylinder 17 is rotating, and its surface has a higher velocity than the feed rate of the web so that the leading portion of the web slips relative to the support surface of the cylinder, but the electrostatic charge induced in the leading portion of the web causes it to be attracted to the cylinder, thereby creating the tension. The contact between the leading portion of the web and the cylinder is sometimes referred to as a "slipping engagement". Once the web is cut into discrete segments, these segments are accelerated to the velocity of the outer surface of the cylinder due to the induced attraction force, and the segments remain in register with the surface of the cylinder. This attraction causes friction between the web 11 and cylinder 17 providing tension in the web 11. This tension acts to cause the web 11 to be in an accurate position on cylinder 17 at the time of cutoff resulting in a cut that is accurate in length and straight across to provide square ends. The tension in the web 11 also causes it to track uniformly as it is fed to cylinder 17. The tension generated by the static charge provides the means for accurate processing of the web from the feed roll 13.

The length 14 on cylinder 17 is cut from web 11 using a rotatable cutoff roll 21 which holds the cutter knives 20. The cutter knives 20 contact the applicator cylinder 17 with considerable force to provide what is commonly called a pressure cut in the industry. The knives 20 are typically hardened steel of 40 to 50 Rockwell C. This requires that the applicator cylinder 17, which also acts as an anvil for the knives 20, to be hardened to a higher hardness, typically in the range of 60 to 65 Rockwell C but at least 55 Rockwell C. The roll 21 has a circumference and number of knives or blades 20 spaced around the roll 21 to provide the desired cutoff for length 15.

As the inventive applicator cylinder 17 does not have vacuum holes it its surface, the knives 20 can cut at any place on the cylinder. This freedom of not having to avoid vacuum holes makes it possible to cut virtually any label length 14 using fewer cutoff cylinders if they are operated at constant speed or even only one cylinder if it rotated by a computer controlled servo motor system that can vary the cylinder speed within the time of each rotation.

Static charge generating bars 22 are positioned along the surface of the applicator cylinder 17 following the cutoff location. The bars 22 are positioned in sufficient numbers to provide an attraction force up to the point of application A provided by the nip between the cylinder 17 and an impression cylinder 23. The cylinder 23 also can serve to advance the carrier 16. Electrostatic shields 24 are used to permit the bars 19, 22 to be positioned close to the roll 21 which is typically made of steel and is electrically conductive enough to create an inadvertent electrical ground. The attracting force must be sufficient to hold the length 14 against windage forces as well as gravity in order to accurately position the length 14 on the carrier 16. The attraction force must be dissipated at or near the point of application A to the carrier 16 to facilitate transfer from cylinder 17 to carrier 16.

The applicator cylinder 17 is typically made of steel which has sufficient electrical conductivity to dissipate the static charge in sufficient time. The cylinder is typically maintained at electrical ground to facilitate its ability to dissipate the static charge. It is apparent that the conductivity of the applicator cylinder can be enhanced by using materials or coatings of copper or aluminum which have higher conductivity than steel. Conversely the conductivity of the applicator cylinder 17 can be reduced by using materials of coatings of less conductive material. The desired conductivity is such that the static charge be dissipated in a period of time (a) which is a function of magnitude and location of the applied electrostatic charge. More particularly, the dissipation time required to release the length 14 at point A is a function of (a) the arrangement of the charge bars 22, (b) the magnitude of the electrostatic charge as a result of the magnitude of the DC voltage applied and (c) the conductivity of the materials of the length 14 and cylinder 17.

Figure 2:
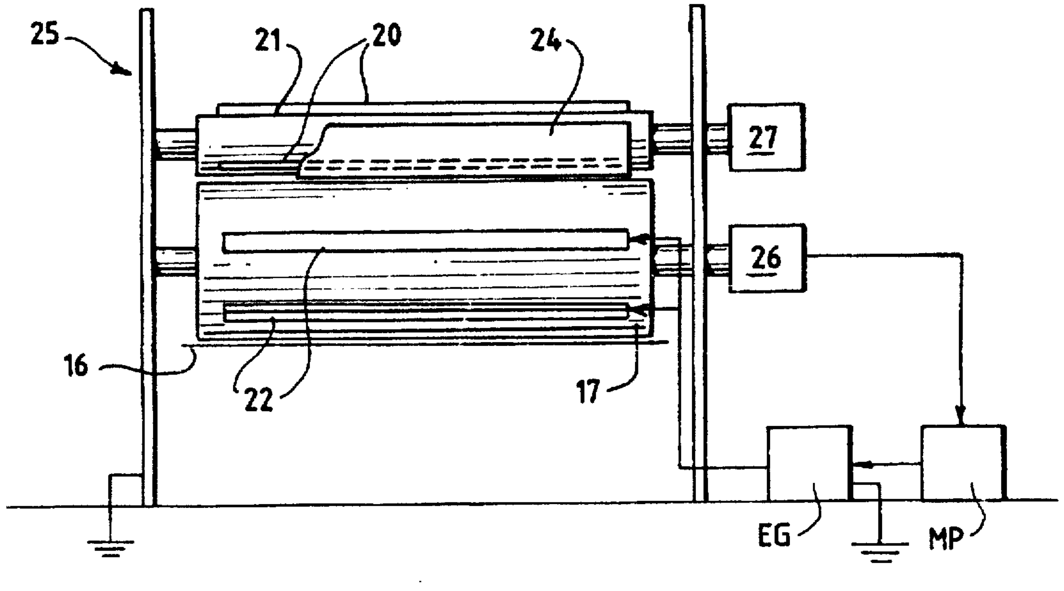
FIG. 2 is an end elevational view such as would be seen along the sight line 2—2 applied to FIG. 1.

The inventive apparatus controls the static charge on piece 14 by the voltage delivered to the charge bars 19, 22 which is easily adjustable by regulating the voltage input to the static charge generator EG—see FIG. 2. Charge bars 22 near the point of application A can be shut down if more time is needed to dissipate the charge.

It has been found that surface speeds of 500 feet/min. on the surface of the applicator cylinder 14 can easily be achieved using these controls on a steel applicator cylinder without the use of mechanical stripping devices, air knife or other additional apparatus to achieve reliable release and transfer of a paper length 14 to a paper carrier 16 even when the adhesive used is in a small amount and of low initial tack. This is done using a carrier of paper which has low electrical conductivity. A carrier with good conductivity, steel or aluminum for example, held at electrical ground, can be used to further decrease the time to dissipate the static charge. Conversely, the time to dissipate the static charge can be increased by using materials or coatings on applicator cylinder 17 with lower conductivity. The desired conductivity is such that the static charge be dissipated in a period of time consistent with the speed of the applicator cylinder, the magnitude of the static charge to be dissipated and the material of length 14. It can be seen that the ability to transfer the length 14 without the complication and unreliability of additional mechanism is a great advantage of the inventive apparatus.

Reference to FIG. 2 reveals that the apparatus includes a frame generally designated 25 providing spaced supports for the cylinder 17 and roll 21. The cylinder 17 is driven by a motor 26 and the roll 21 by motor 27. The cylinder receives discrete lengths 14 cut by the knives 20 on roll 21 at the point of transport T.

EXAMPLE 1

This example illustrates what could be considered one extreme situation addressed advantageously by the instant invention. This can be epitomized by the use of a pressure sensitive adhesive which is employed to combine the length 14 with the carrier 16. Pressure sensitive adhesives have immediate tack and immediate strength. Thus, a considerable attraction between the label length 14 and the applicator cylinder 17 can be overcome when a pressure sensitive adhesive is employed in the interface between the length 14 and the carrier 16, i.e., at the point of application A.

In such a case, the magnitude of the voltage provided on the electrostatic charge bars 22 can be close to maximum and still not interfere with the desired transfer of the length 14 from the cylinder 17 to the carrier 16. The maximum voltage normally is that just shy of the voltage promoting arcing by the charge bars. And, in the case of pressure-sensitive adhesives with the accompanying immediate high tack and strength, it is possible to have this voltage applied even on the bar or bars immediately adjacent the point of application A. In contrast, the other extreme requires different conditions as will be explained in the following EXAMPLE 2.

EXAMPLE 2

As a specific illustration of an application of the invention where there has to be substantial dissipation of the electrostatic forces attracting the length 14 to the cylinder 17 at the point of application A is the instance of an envelope window covering as mentioned previously. In the industry of paper forms and the like, very often envelopes are equipped with cutouts to expose addressee and address information on a letter or other insert within the envelope. In many cases, it is either advantageous or desirable, or both, to have this opening covered by a transparent covering so as to limit the possible access to the interior, degradation of the printing on the interior material, etc.

In the art of providing window envelopes, a very light pattern of adhesive usually is applied around the perimeter of the window opening. The adhesive required has a low initial tack although it develops a strong bond in time upon drying. Thus, it is lacking the immediate attraction developed by a pressure-sensitive adhesive as well as the strength accompanying this attraction. For this purpose, therefore, the invention provides for regulation of the amount and location of the voltage on the electrostatic charge bars 22. For example, the voltage on the charge bar 22 immediately adjacent the point of application A can be a function of the speed of the applicator cylinder 17. When the cylinder 17 is rotating slowly—as upon startup—the voltage is increased because the slow movement of the cylinder (and the accompanying lengths 14) gives whatever charge has been applied a substantial time to dissipate. But, as speed is increased, the time available for dissipation is decreased and therefore lower voltages can be employed and, in some instances, the voltage may even be removed entirely from that bar 22 closest to the point of application A.

This same control technique is applicable to those installations where the commonly used adhesive is a water emulsion and characterized by low initial tack.

The means for implementing the control of both the magnitude of the voltage and the location (insofar as the various bars 22 are concerned), is advantageously provided by the generator EG which has associated therewith variable input voltage and selective controls for the individual bars. A suitable generator for this purpose is available from the SIMCO Company of Hatfield, Pa. which has an output voltage control.

Insofar as the control of the bars 19 upstream of the cut developed by the knives 20 acting on the surface of the applicator cylinder 17, I have found that it is advantageous to operate these at near maximum voltage inasmuch as there is no transfer contemplated at this point. By maximum, I again refer to the fact that this is just below the arcing voltage to the charge bars and therefore the maximum attraction is developed between the web 11 and the cylinder 17.

FIG. 3 EMBODIMENT

Figure 3:
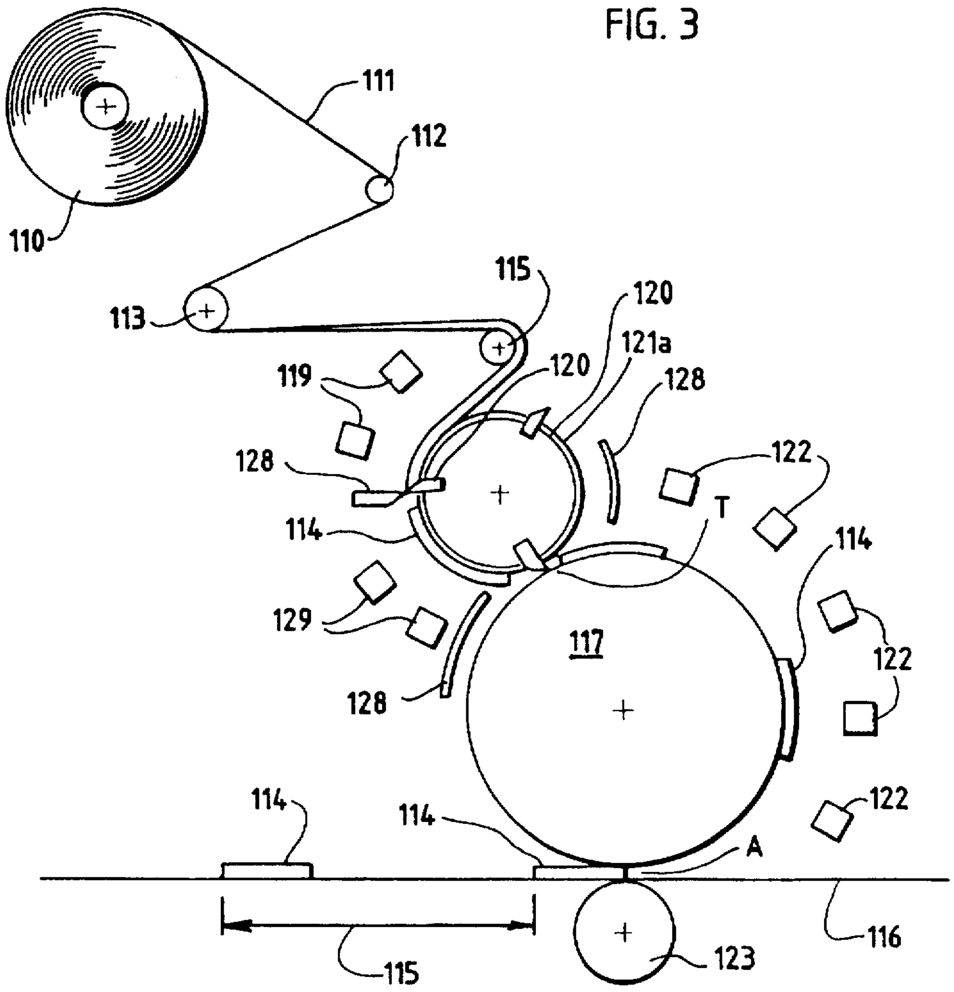
FIG. 3 is a view similar to FIG. 1 but of another arrangement of apparatus employed to advantage in the practice of the invention.

FIG. 3 shows another embodiment wherein the apparatus is arranged to cut length 114 from a continuous web 111 and transfer the length to an applicator cylinder 117 for eventual transfer to a carrier 116. In this embodiment, numerals similar to those of the first-described embodiment are employed for corresponding elements, except that they are increased by 100.

A roll of material 110 unwinds to create the web 111. The web 111 is routed around an idler roll 112 to a feed roll 113. The desired length of the length 114 is obtained by adjusting the length of web 111 fed by feed roll 113 during one cutting cycle. The web is then routed to the cutoff roll 121 using idler 115A. Cutoff roll 121 carries at least one cutting knife 120. This knife cooperates with fixed knife 128 to sever the length 114 from web 111. Static generating bars 119 are positioned around the circumference of the cutoff roll 121 to cause the web 111 to be attracted to the roll 121. These, like the bars 19 of FIG. 1 are positioned upstream of the cut provided by the cutoff roll 121. The roll 121 has knives 120 which cooperate with a stationary knife 128 which is slightly upstream of the point of transport 127.

This attraction is used to create a tension in the web 111 which is utilized to feed and position the web 111 uniformly on the roll 121 so it is in the proper position for accurate cutoff of length 114. The charge downstream of the cut can be maintained by timely reinforcement of the charge using multiple bars 129 spaced around the downstream portion of the circumference of roll 121. After length 114 is severed, it is transferred to applicator cylinder 117 at point of transport T. The cut length 114 is carried by cylinder 117 using electrostatic charges provided by static charge bars 122 positioned around the circumference of applicator cylinder 117 from the point of transport T to the point of application A where it is transferred to the carrier 116. The electrostatic charge must be dissipated before the point of transfer A as described in relation to the apparatus in FIG. 1 using the same provisions as described.

The magnitude of the electrostatic charge on bars 129 and their location is used to facilitate the transfer illustrated at point of transport T. As described in EXAMPLES 1 and 2 different conditions of material, speed, etc. require differences in control. I also provide electrostatic shielding at 124 that can be used to permit close positioning of the bars 122 and 129 to the cylinder 117 and roll 121 or other structure of the apparatus.

EMBODIMENT OF FIG. 4

Figure 4:
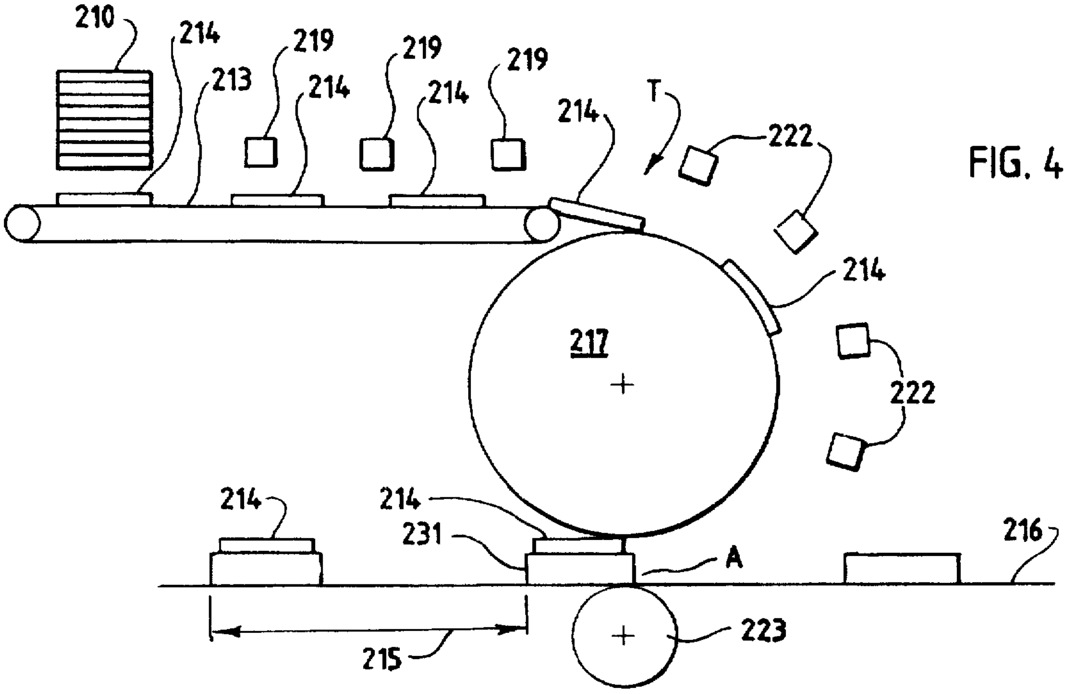
FIG. 4 is a view similar to FIGS. 1 and 3 but of still another version of the apparatus.

FIG. 4 shows an embodiment in which the applicator cylinder 217 is used to apply an individual sheet 214 from pack 210 to a carrier 216. The applicator cylinder 217 receives a previously prepared sheet 214 which may be fed from a pack 210 onto a conveyor 213. The individual sheet 214 could also be prepared in another apparatus that delivers this sheet 214 to the conveyor 213 or even directly to cylinder 217. Static generating bars 219 may be used to hold sheets 214 in place and in position on conveyor 213. Other well known means such as conveyor chains, or belts with lugs, or vacuum belts can be used for this purpose. The sheet 214 is transferred to the applicator cylinder 217 at point T and held in position on cylinder 217 as before by electrostatic attraction produced by static generating bars 222. The sheet 214 moves with the cylinder 217 to point A where it is transferred to the carrier 216. The static charge is dissipated before the point of transfer as described previously in order that the transfer can be made without the use of additional apparatus to strip the sheet from cylinder 217 for application to containers 231 having an interval 215.

As illustrated in FIGS. 1 and 2, the control of the output DC voltage of generator EG and the shutting down of certain of the bars 22 can conveniently controlled by a microprocessor MP receiving an input of the speed of cylinder 17 as well as instructions from the operator of the apparatus concerning which bars are to be shut down or have their voltage controlled by the microprocessor MP.

SUMMARY OF STRUCTURE

The inventive label applicator includes a frame 25, an applicator cylinder 17, 117, 217 rotatably mounted on the frame, and means 26 operably associated with the frame for rotating the applicator cylinder. Also operably associated with the frame 25, are source 11, 111 of label web material and means 13, 113, 213 for advancing the label web material along a path P from the source to the applicator cylinder. Provided on the frame are means 20, 21, 17, 120, 121, 128 on the frame in the aforesaid mentioned path for transversely severing the label web material into discrete lengths 14, 114, 214.

Further associated with the frame 25 are means 22, 122, 222 operably associated with the frame for applying an electrostatic charge to the discrete lengths and means for advancing carrier means 16, 116, 216 for sequentially receiving the discrete lengths at a point of application A.

In FIGS. 1 and 2, for example, I provide a means in the form of an electrostatic charge generator EG and a microprocessor MP which are operably associated with the applying means 19, 22 for controlling the magnitude and location of electrostatic charge and thereby controlling the attraction of the discrete lengths 14 to the applicator cylinder 17 between the point of severance S developed by the severing means, 20, 21, 17 and the point of application A.

In FIGS. 1 and 2, for example, are provided means in the form of a microprocessor MP which controls the magnitude of the static charge supplied to applying means 19, 22 by electrostatic generator EG and to shut down certain of the bars 22 to provide the desired attraction and dissipation of the static charge between the point of transport T and point of transfer A.

The impression cylinder 223 is used to provide a nip between cylinder 217 and container 231 to said in the transfer. Cylinder 223 can also serve to advance containers 231. Other means to advance the containers or carrier means such as feed rolls, conveyor chains and belts well known in the art can also be used for this purpose.

Viewed alternatively, the invention utilizes the electrostatic charge applying means for applying such charges to only a portion of the applicator cylinder—as can be appreciated from a consideration of FIGS. 1, 3 and 4.

Still further, the invention can be viewed as providing grounding means as at G (see FIG. 2) operably associated with the applicator cylinder 17 for dissipating electrostatic charge to release and transfer the discrete lengths 14 at the point of application A. Advantageously, the grounding means G are operably associated with the frame and all of the aforesaid means except, of course, the applying means, i.e., the electrostatic charge applying portion of the generating bars 19, 22, etc.

The generating means EG is advantageously effective to generate voltages in the range of about 3,000 volts D.C. to about 50,000 volts D.C. In general, the closer the electrostatic applying means (the bars 19, 22 as illustrated in FIG. 1) are to the applicator cylinder 17, the lower the voltage required to effect electrostatic attraction or cling of the labels or lengths 14 to the applicator cylinder 17.

The severing means (illustrated as at 20, 21 and 17 in FIG. 1) includes the cutoff roll 21 rotatably mounted on the frame 25 and driven as at 27 (see FIG. 2). A knife or knives 20 are mounted in the roll 21 and are effective to transversely sever the label web material 11 into lengths or labels 14 by pressure contact with the applicator cylinder 17. By pressure contact, I refer to the fact that there is a substantial force on the order of 100 lbs/inch of width of the web material applied through the web material 11, for example, by using the surface of the applicator cylinder 17 as an anvil. For this purpose, the applicator cylinder 17, 117 has a surface hardness of at least about 55 Rockwell C and preferably in the range of 60 to 65 Rockwell C. The knives 20, on the other hand, are slightly less hardened, viz., to 40 to 50 Rockwell C, but are still constructed of hardened steel.

Still focusing on the area of the apparatus involving transverse severing, it will be noted that there is electrostatic shielding as at 24 or 124 which can be mounted on the sides of the frames 25 and are adjacent the applying means 19, 119, 22, 122 to prevent inadvertent grounding. This permits the applying means to be located close to the cutoff roll 21, 121 providing the dual benefits of compactness of installation and the ability to control the severed piece or length 14, 114, 214 at almost the moment of its detachment from the web 11, 111. Further, the provision of the shielding means prevents inadvertent grounding which would frustrate the achievement of electrostatic attraction at the desired point or areas. Also in line with preventing inadvertent grounding, it is possible to equip the cutoff roll with an electrically insulated periphery—see for example the periphery 121*a* in FIG. 3.

SUMMARY OF OPERATION

The method of the invention can be summarized as applying labels which include the steps of providing (a) an applicator cylinder such as is illustrated in FIG. 1 at 17 along with lengths of label material. The invention also includes the step of traveling these discrete lengths of label material with the applicator cylinder while applying an electrostatic charge to the discrete lengths.

The method of operation for applying labels which usually are either flexible paper or flexible plastic includes the steps of providing (a) an applicator cylinder (designated 17 in FIG. 1) and (b) means (as at 26 in FIG. 2) for rotating the applicator cylinder. The invention also includes the step of providing a source 10, 110, 210 of discrete lengths 14, 114, 214 of label material.

The action performed on these discrete lengths 14, 114, 214 is to travel them with the applicator cylinder 17, 117, 217, as the case may be. During the travel of the discrete lengths with the cylinder, I apply an electrostatic charge to the discrete lengths which is illustrated in FIG. 1 by the bars 22 which extend over a portion of the circumference of the applicator cylinder 17 between the point of severance S and the point of application A.

The point of application A is the intersection of the periphery of the rotating cylinder 17 and the advancing carrier 16. This intersection is designated by the symbol A and can be considered, in the illustration given in FIG. 1, as the nip between the impression cylinder 23 and the applicator cylinder 17. As indicated previously, the impression cylinder 23 may cooperate in advancing the carrier means 16 for sequentially receiving the discrete lengths 14 from the applicator 17 at the point of application A.

Further, in the practice of the invention, I equip one of (a) the carrier means 16, 116, 216 and (b) the discrete lengths 14, 114, 214 with an adhesive having an initial tack—see 14*a* in FIG. 1 for adhesive on the carrier. This, as pointed out previously, may have some variation from a "high" tack characteristic of many pressure sensitive adhesives to a "low" initial tack which is characterized by a light coating or a coating of a water emulsion adhesive, for example. It is the attraction of this initial tack which can overcome the attraction of the discrete lengths to the applicator cylinder adjacent the point of application. More particularly, I control the attraction developed by the electrostatic charge bars 22, for example, so that the type of adhesive employed (on either 14 or 16) is sufficient to counteract the charge and permit release and transfer of the discrete lengths 14 from cylinder 17 to the carrier 16.

In the general operation, the voltage is applied to the bars 22 at a relatively high value. This can be readily ascertained by checking for arcing and if the same occurs, lowering the applied voltage until arcing is terminated. The apparatus is started up, i.e., the various parts energized as by rotating the feed roll 13, the applicator cylinder 17, the cutoff roll 21 and the impression cylinder 23. At startup, the apparatus is generally running slowly so there is considerable time for the dissipation of the charge as the discrete lengths 14 approach the point of application A. To overcome this dissipation of electrostatic energy, I maintain the high voltage on all of the bars until a speed is reached where the attraction developed by this high voltage on all of the bars would interfere with the easy release and transfer of the discrete lengths 14 to the carrier 16. As the speed of the apparatus is increased, two adjustments are possible. One adjustment is to lower the voltage and the other is to shut off the voltage to the bar or bars adjacent the point of transfer A using the microprocessor MP. Normally, it is easier to keep the voltage at a high level and shut it off from one or more of the bars adjacent the point of application A.

In other words, the controlling includes providing bar means such as those illustrated at 22 in FIG. 1 for receiving the electrostatic charge, applying an electrostatic charge to the bar means slightly short of that productive of arcing and reducing the voltage of the bar means adjacent the point of application as necessary to dissipate the electrostatic charge sufficiently to permit the initial tack of the adhesive to facilitate release and transfer the discrete lengths 14 to the carrier means 16.

More generally, the controlling step of the invention contemplates controlling the magnitude and location of the electrostatic charge for controlling the attraction of the discrete lengths 14 to the applicator cylinder 17 between the point of transport T and the point of application A. This controlling also is a function of (a) the spacing of the bar means 22 from the cylinder 17 and/or (b) the magnitude of the DC voltage applied to the charge bars 22, (c) the time required to dissipate the electrostatic static charge from cylinder 17 and (d) the speed of the cylinder 17. The speed of dissipation of the electrostatic charge is determined by (a) the conductivity of cylinder 17, (b) the conductivity of the material of length 14, (c) humidity of the surrounding air, (d) the temperature of cylinder 17, length 14 and the surrounding air and (e) the magnitude of the electrostatic charge. The initial tack characteristics of the adhesive applied on the length 14 or alternately on carrier 16 as shown as **14*a* in FIG. 1 determine the extent of dissipation required to provide reliable release and transfer of the length 14 from cylinder 17 to the carrier 16**.

Also to be considered as a factor in determining the time of dissipation is the character of the carrier means which can be a variety of items ranging from planar webs to three dimensional containers with various degrees of conductivity. A more conductive carrier speeds dissipation of the electrostatic charge.

While in the foregoing specification, a detailed description of the invention has been set down for the purpose of explanation, many variations in the details hereingiven may be made by those skilled in the art without departing from the spirit and scope of the invention.

I claim:

1. A method of handling discrete lengths of material having a first and second side from a source of said material, and transferring said discrete lengths to a carrier, at least a portion of one of said first side of said material and carrier being coated with an adhesive having an initial tack, comprising:

transporting said discrete lengths of said material in spaced relation on the surface of a rotating applicator cylinder with said second side of said discrete lengths contacting said surface of said applicator cylinder, applying an electrostatic charge to said discrete lengths to adhere said discrete lengths to said surface of applicator cylinder;

advancing said carrier for sequentially receiving said discrete lengths from said applicator cylinder at a transfer location; and controlling the intensity of said electrostatic charge on said discrete lengths while said discrete lengths are adhered to said applicator cylinder under electrostatic attraction by applying a controlled voltage to a plurality of charge bars moving said discrete lengths to said transfer location, thereby controlling said electrostatic attraction of said discrete lengths to said applicator cylinder during said transporting step to permit said initial tack to transfer said discrete lengths from said applicator cylinder onto said carrier.

2. The method of claim 1 where in said material comprises label web material and wherein said method includes advancing said web of label material along a path from said source to said applicator cylinder and transversely severing said label web material into said discrete lengths while said label material is contacting said applicator cylinder.

3. The method of claim 1 wherein said step of controlling comprises controlling the magnitude and location of said electrostatic charge such that said electrostatic attraction of said discrete lengths to said applicator cylinder diminishes to facilitate said transfer of said discrete lengths to said carriers.

4. The method of claim 1 characterized in that said adhesive is applied to a portion of said one side of said material.

5. An apparatus for applying discrete lengths of a web material to a carrier at a transfer location comprising:

a rotating applicator cylinder;

feed means for supplying said web material to said applicator cylinder;

means for forming said web material into discrete lengths and for applying said discrete lengths to said rotating applicator cylinder in spaced relation;

said discrete lengths having a first side;

one of said first side of discrete lengths, and said carrier including adhesive having an initial tack;

means for advancing said carrier for receiving said discrete lengths from said applicator cylinder;

a plurality of charge bars operatively associated with said applicator cylinder for controlling the electrostatic attraction force between said discrete lengths and said applicator cylinder and for controllably diminishing said force as said discrete lengths approach said transfer location;

said apparatus characterized in that said discrete lengths applied to said rotating applicator cylinder are brought into proximity with said carrier at said transfer location so that said discrete lengths are removed from said applicator cylinder and transferred to said carrier by means of said initial tack.

* * * * *